(12) United States Patent
Ryu (10) Patent No.: US 10,421,423 B2
(45) Date of Patent: Sep. 24, 2019

(54) INTEGRATED SIDE MEMBER WITH IMPACT ABSORBING STRUCTURE

(71) Applicants: Hyundai Motor Company, Seoul (KR); Kia Motors Corporation, Seoul (KR)

(72) Inventor: Se-Ho Ryu, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/835,117

(22) Filed: Dec. 7, 2017

(65) Prior Publication Data

US 2018/0339668 A1    Nov. 29, 2018

(30) Foreign Application Priority Data

May 25, 2017    (KR) .................. 10-2017-0064566

(51) Int. Cl.
| | | |
|---|---|---|
| *B62D 21/15* | (2006.01) | |
| *B62D 25/08* | (2006.01) | |
| *B62D 25/20* | (2006.01) | |
| *B60R 19/18* | (2006.01) | |
| *B60R 19/04* | (2006.01) | |
| *B60R 19/24* | (2006.01) | |
| *B60K 1/04* | (2019.01) | |

(52) U.S. Cl.
CPC .............. *B60R 19/18* (2013.01); *B60R 19/04* (2013.01); *B62D 25/08* (2013.01); *B60K 2001/0438* (2013.01); *B60R 2019/247* (2013.01); *B62D 21/152* (2013.01); *B62D 25/082* (2013.01); *B62D 25/2018* (2013.01); *B62D 25/2045* (2013.01)

(58) Field of Classification Search
CPC .... B62D 21/15; B62D 21/152; B62D 21/155; B62D 25/08; B62D 25/082; B62D 25/2018; B62D 25/2045

See application file for complete search history.

(56) References Cited

U.S. PATENT DOCUMENTS

| | | | | |
|---|---|---|---|---|
| 6,209,948 B1* | 4/2001 | Mori | ................... | B62D 21/152 |
| | | | | 296/187.09 |
| 2013/0069393 A1* | 3/2013 | Kihara | ................. | B62D 25/082 |
| | | | | 296/203.02 |
| 2014/0333056 A1* | 11/2014 | Yoshida | .............. | B62D 21/155 |
| | | | | 280/834 |
| 2015/0061325 A1* | 3/2015 | Cho | ..................... | B62D 25/085 |
| | | | | 296/193.09 |

(Continued)

FOREIGN PATENT DOCUMENTS

KR    20030000253 A    1/2003

*Primary Examiner* — Gregory A Blankenship
(74) *Attorney, Agent, or Firm* — Morgan, Lewis & Bockius LLP (57) ABSTRACT

An integrated side member having an impact absorbing structure may include a side member upper part connected to a front coupling end portion to be connected to a crash box, the side member upper part being formed in a 'U' shape by connecting its left and right members to each other, side member lower parts fastened to the side member upper part, and a dash cross member coupled to a lower portion of the side member upper part and between both side member lower parts.

9 Claims, 10 Drawing Sheets

(56) References Cited

U.S. PATENT DOCUMENTS

| | | | |
|---|---|---|---|
| 2015/0102636 A1* | 4/2015 | Cho | B62D 25/08 |
| | | | 296/187.09 |
| 2016/0059892 A1* | 3/2016 | Lee | B62D 21/152 |
| | | | 296/187.09 |
| 2017/0088178 A1* | 3/2017 | Tsukada | B60K 1/04 |
| 2017/0106909 A1* | 4/2017 | Daido | B60R 19/02 |
| 2017/0291643 A1* | 10/2017 | Sakamoto | B62D 25/082 |
| 2018/0065668 A1* | 3/2018 | Maier | B62D 25/08 |
| 2018/0170434 A1* | 6/2018 | Saito | B62D 21/11 |
| 2018/0201326 A1* | 7/2018 | Geng | B60R 19/34 |

\* cited by examiner

INTEGRATED SIDE MEMBER WITH IMPACT ABSORBING STRUCTURE

CROSS-REFERENCE(S) TO RELATED APPLICATIONS

The present application claims priority to Korean Patent Application No. 10-2017-0064566, filed on May 25, 2017, the entire contents of which is incorporated herein for all purposes by this reference.

BACKGROUND OF THE INVENTION

Field of the Invention

The present invention relates to an integrated side member having an impact absorbing structure, and more particularly to an integrated side member having an impact absorbing structure that can secure a space for mounting a battery of an electric vehicle mounted with a high capacity battery and at the same time prevent impact energy from invading into a passenger cabin of the vehicle.

Description of Related Art

Generally, front side members disposed longitudinally at both front lateral sides of a vehicle body are required to have a certain configuration for protecting passengers from impact energy when the vehicle collides with an object.

Figure 1A:
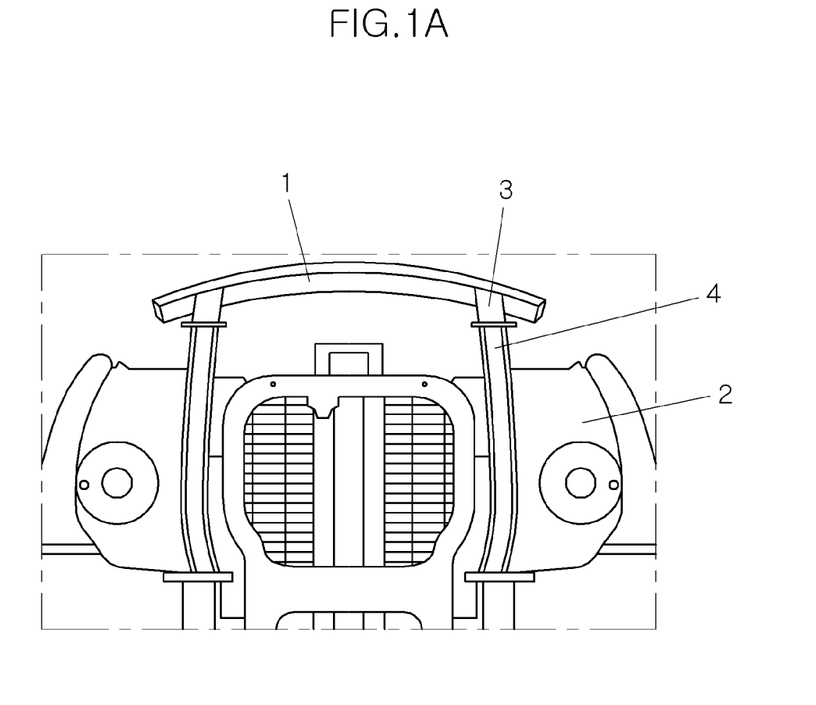
FIG. 1A is a view showing a vehicle body according to the related art.

FIG. 1A shows a vehicle body of a common vehicle, to which a bumper beam 1, crash boxes 3, side members 4 and aprons 2 are combined. As shown in FIG. 1, the vehicle body is required to have a configuration for protecting passengers from impact energy when the vehicle collides with an object. At this time, the front side members 4 play an important role as a shock absorbing device. The front side members 4 are the most important skeletal parts constituting front parts of the vehicle and correspond to rigid members on which an engine and other important parts are mounted.

Such front side members 4 are coupled respectively to the crash boxes 3 which are coupled to opposite sides of the rear end portion of the front bumper beam 1. Each of the front side members includes an impact absorbing portion for relieving the impact from impact energy and an invasion preventing portion for preventing the impact from invading into a passenger compartment.

On the other hand, fuel economy regulations that become more stringent as years go by have facilitated development of electric vehicles by automakers. Environmental friendly vehicles become increasingly wide spread according to support policies on environmental friendly vehicles in worldwide countries in addition to such regulations. Also, competition for increasing traveling distance of environmental friendly vehicles becomes intensified among the automakers. Accordingly, to enhance the traveling distance of an electric vehicle which is a typical environmental friendly vehicle, size of a battery mounted on the vehicle is increasingly enlarged, with the result that weight of the vehicle is inevitably increased.

Such increase in the weight of the vehicle definitely causes increase of impact energy in the event of vehicle impact and hence may seriously affect safety of passengers. Also, in the case of electric vehicles, there are additional regulations related to battery fire, etc. that have to be considered when evaluating impact. Therefore, it is necessary to improve the impact performance.

Figure 1B:
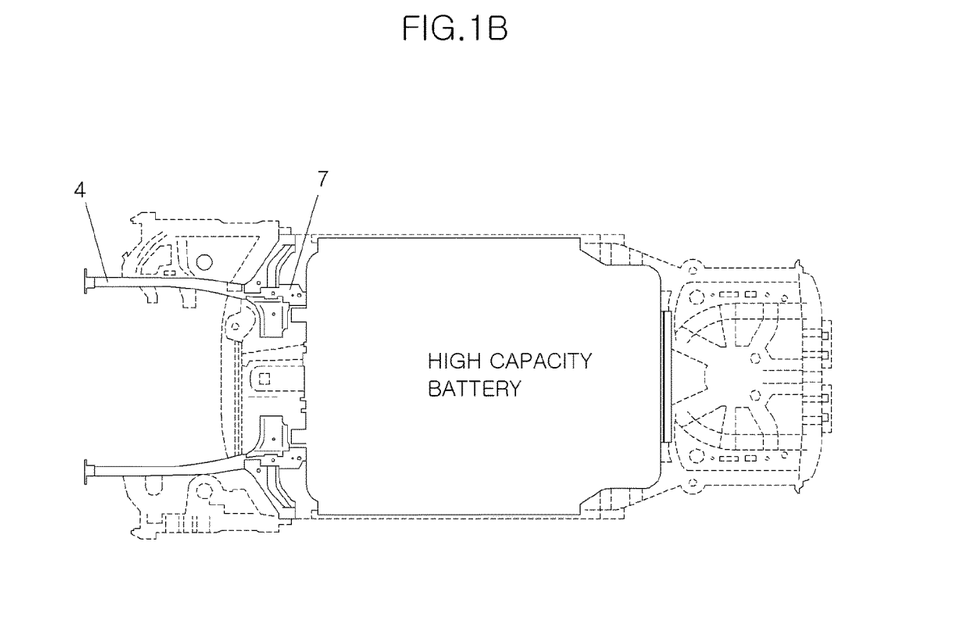
FIG. 1B is a view showing a vehicle provided with a large capacity battery according to the related art.

In other words, in vehicles mounted with the side member according to the related art, since a space for absorbing the impact energy is reduced when a large capacity battery is mounted at a position of a rear lower member 7, as shown in FIG. 1B, there are problems in that electric vehicles cannot utilize the existing vehicle body structure and that it is difficult for the existing structure to meet the regulations related to impact and merchantability because of the increase in the weight of the vehicle.

Furthermore, in the vehicles mounted with the side member according to the related art, structure thereof becomes very complicated and fastening performance deteriorates because of lack of gaps between peripheral parts including a sub-frame and side external parts.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an integrated side member having an impact absorbing structure in which a side member upper part, a dash cross member and side member lower parts are combined to effectively absorb impact energy of an electric vehicle mounted with a large capacity battery such that passengers and the large capacity battery are protected at the same time.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with one aspect of the present invention for accomplishing the object as described above, there is provided an integrated side member having an impact absorbing structure, including a side member upper part connected to a front coupling end portion to be connected to a crash box, the side member upper part being formed in a 'U' shape by connecting its left and right members to each other; side member lower parts fastened to the side member upper part; and a dash cross member coupled to a lower portion of the side member upper part and between both side member lower parts.

The side member upper part may include a connection portion for connecting the left member and the right member.

The side member lower parts are formed in a 'Y' shape respectively.

Each of the side member lower parts may include a straight coupling portion coupled to the left or right member, an inclined portion extending at a predetermined angle and a predetermined slope from the straight coupling portion, a rear lower portion branched from the inclined portion to one side, and a mounting portion branched from the inclined portion to the other side.

The side member lower parts are configured to transfer impact energy to a chassis and a side chamber through their rear lower portions and mounting portions.

The rear lower portion and the mounting portion are formed to have their respective height lower than that of the straight coupling portion and then coupled to the lower portion of the vehicle body.

The dash cross member is configured to increase rigidity of both the side member upper part and the side member lower part.

The connection portion of the side member upper part is configured to prevent rigid bodies in an engine compartment from striking a passenger cabin of a vehicle.

One side of the connection portion is formed with a coupling portion to be coupled to a vehicle body.

Furthermore, the left and right members are formed in a 'Π' shape in section together.

In the side member upper part according to an exemplary embodiment of the present invention, a connection portion is formed between the left and right members to widen the contact area of the rigid body in the event of impact and a dash cross member reinforces rigidity, further enhancing safety of passengers.

Moreover, the left and right members of the side member upper part according to an exemplary embodiment of the present invention are connected to each other so that local deformation of the vehicle body is prevented and at the same time a motor module is prevented from directly striking a dash panel in the event of frontal impact.

With the integrated side member having the impact absorbing structure according to an exemplary embodiment of the present invention, it is possible to easily secure a space for mounting a large capacity battery for an environmental friendly vehicle and also easily secure merchantability of the environmental friendly vehicle while satisfying requirements involved in reducing space of the vehicle body and increasing weight of the vehicle, which are required under regulations related to impact.

Furthermore, the integrated side member having the impact absorbing structure according to an exemplary embodiment of the present invention is integrally formed so that a structure for welding can be improved and assemblability of the vehicle body can be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings. However, detailed description of functions and constructions well-known in the art, which may obscure the gist of the present invention, will be omitted in the following description and accompanying drawings. Furthermore, it is noted that like elements are denoted by the same reference numerals, if possible, throughout the drawings.

Terms and words used in the specification described below and claims may not be construed as their ordinary or dictionary sense. On the basis of the principle that the inventor may define appropriate concepts of the terms to describe his or her own invention in the best way, the terms may be construed as meaning and concepts for complying with the technical idea of the present invention. Accordingly, construction shown in the exemplary embodiment described in the specification and the drawings is nothing but a most exemplary embodiment of the present invention, and it does not cover all the technical ideas of the invention. Therefore, it should be understood that various equivalents and modifications with which the embodiment is replaced at the time of filing the present application may be made. Also, terms "first," "second," etc. are used to describe various elements. They are used only for distinguishing one element from another element, but not used to define the elements.

Figure 2A:
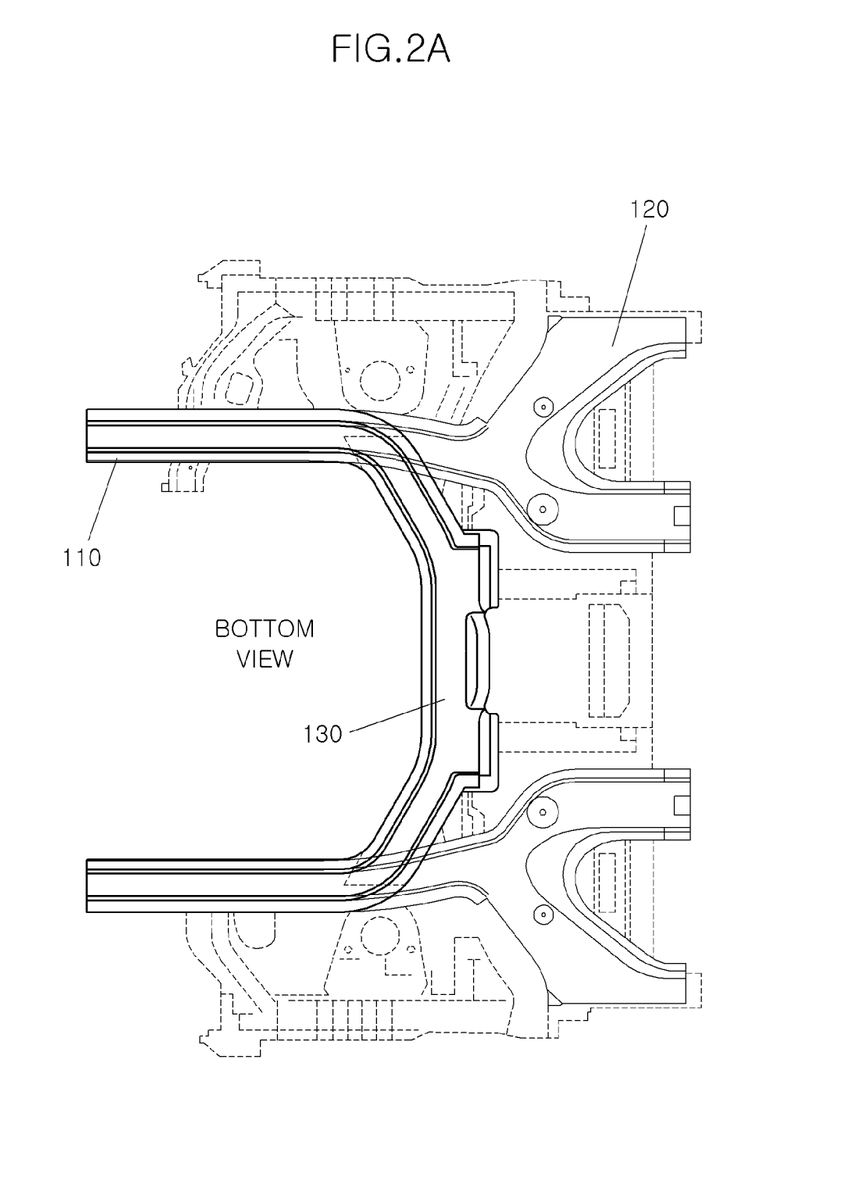
FIG. 2A is a bottom view of an integrated side member having an impact absorbing structure according to an exemplary embodiment of the present invention.
Figure 2B:
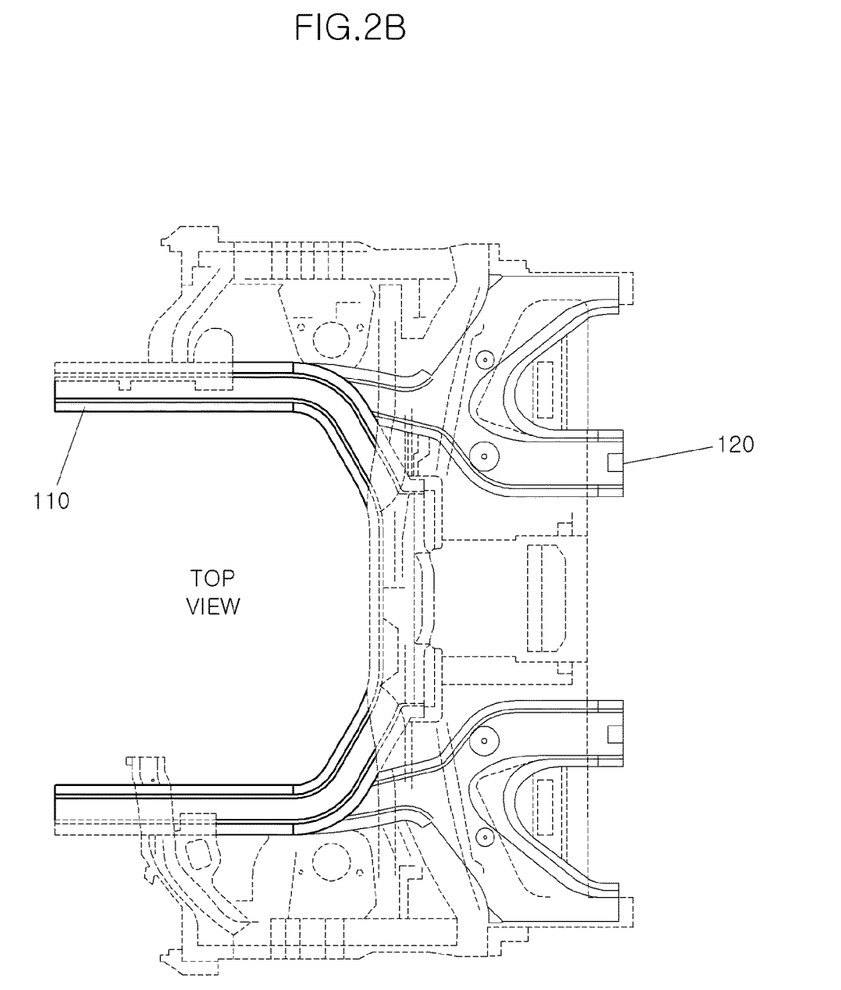
FIG. 2B is a top plan view of an integrated side member having an impact absorbing structure according to an exemplary embodiment of the present invention.
Figure 3A:
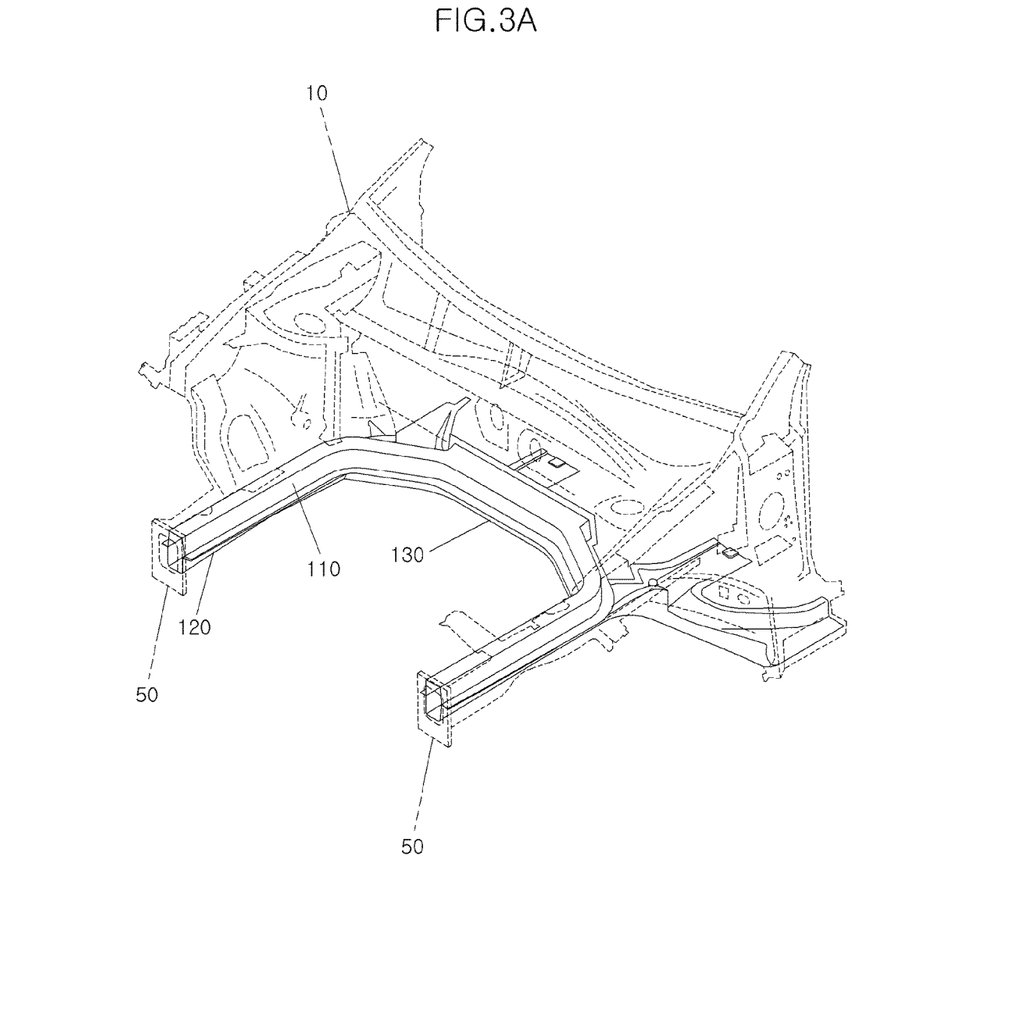
FIG. 3A is a perspective view of an integrated side member having an impact absorbing structure according to an exemplary embodiment of the present invention.
Figure 3B:
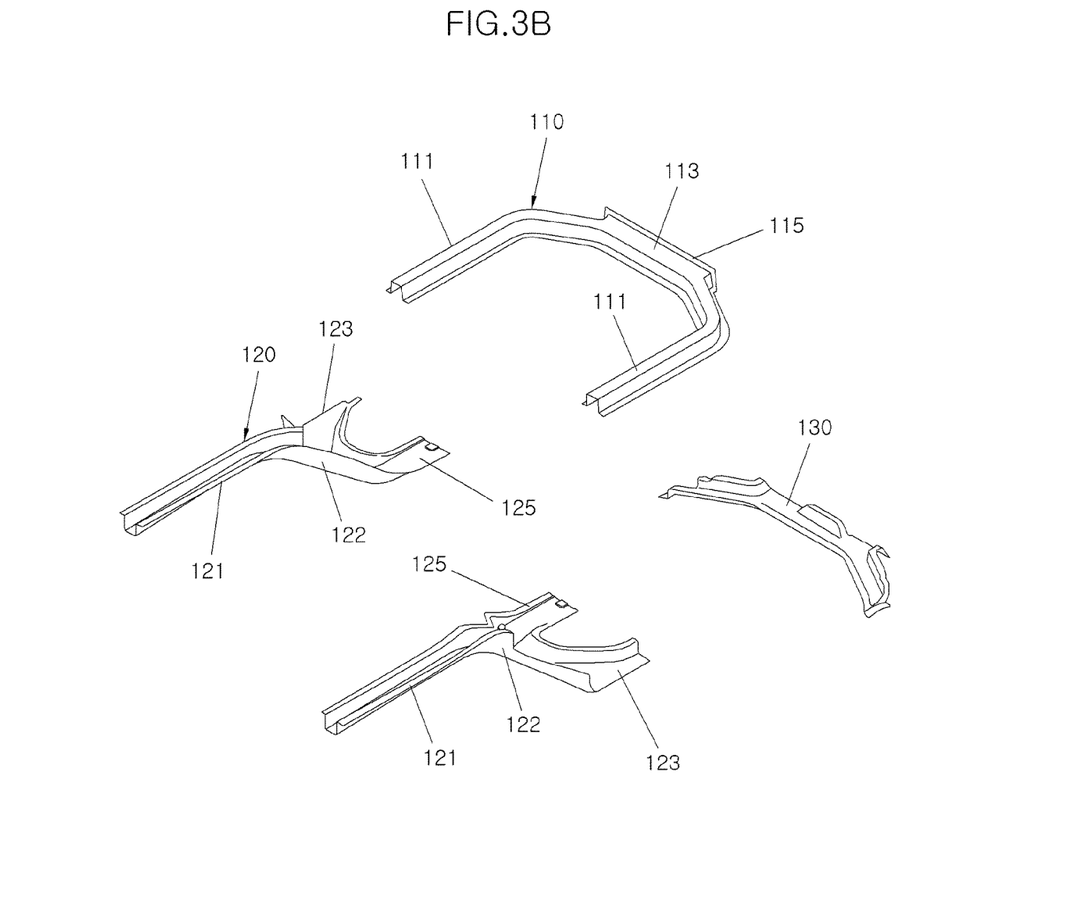
FIG. 3B is an exploded perspective view of an integrated side member having an impact absorbing structure according to an exemplary embodiment of the present invention.

FIG. 2A is a bottom view of an integrated side member having an impact absorbing structure according to an exemplary embodiment of the present invention, FIG. 2B is a top plan view of an integrated side member having an impact absorbing structure according to an exemplary embodiment of the present invention, FIG. 3A is a perspective view of an integrated side member having an impact absorbing structure according to an exemplary embodiment of the present invention, and FIG. 3A is an exploded perspective view of an integrated side member having an impact absorbing structure according to an exemplary embodiment of the present invention.

Referring to FIGS. 2A to 3B, an integrated side member having an impact absorbing structure according to an exemplary embodiment of the present invention includes a side member upper part 110, a side member lower part 120 and a dash cross member 130.

The side member upper part 110 is connected to a front coupling end portion 50 to be connected to a crash box and a left member 111a and a right member 111b thereof are connected to each other, forming a U shape.

Figure 4A:
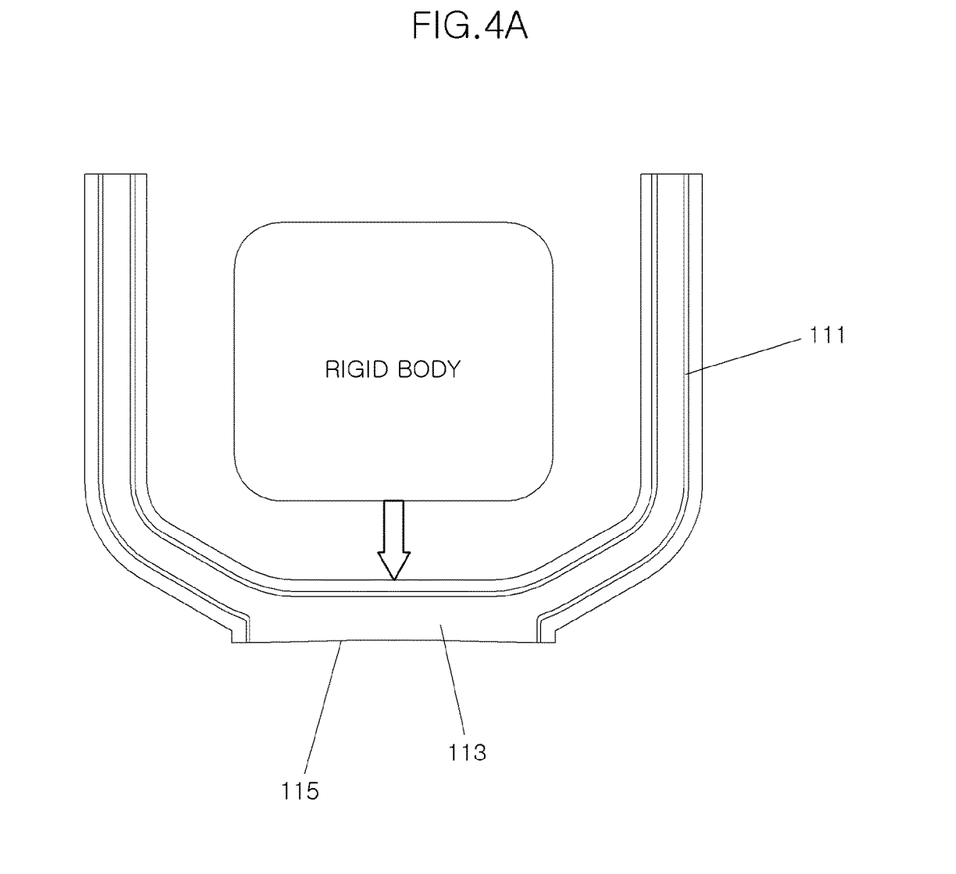
FIG. 4A, FIG. 4B and FIG. 4C are explanatory diagrams showing function of an integrated side member having an impact absorbing structure according to an exemplary embodiment of the present invention.

The side member upper part 110 has a structure in which left and right members of an existing front side member are connected to each other and is configured to prevent rigid bodies in an engine compartment from striking a passenger cabin of a vehicle in the event of vehicle impact, as shown in FIG. 4A.

The side member upper part 110 includes a connection portion 113 connecting the left member 111a and the right member 111b. Furthermore, one side of the connection portion 113 is formed with a coupling portion 115 to be coupled to a vehicle body.

Therefore, by the connection portion of the side member upper part, the side member upper part 110 prevents the rigid bodies in the engine compartment from striking the passenger cabin in the event of vehicle partial and frontal impact.

Furthermore, since the side member upper part 110 is integrally formed in the side member and therefore it is configured for dispersing impact energy, safety of passengers can be enhanced.

For example, considering a rectangular-sectioned column and a circular-sectioned column, which have the same cross-sectional area, from a standpoint of impact, the rectangular-sectioned column having larger contact area with a rigid body has high capacity of absorbing impact energy.

In the side member upper part according to an exemplary embodiment of the present invention, a connection portion is formed between the left and right members to widen the contact area of the rigid body in the event of impact and a dash cross member as described later reinforces rigidity, further enhancing safety of passengers.

Moreover, the left and right members of the side member upper part according to an exemplary embodiment of the present invention are connected to each other so that local deformation of the vehicle body is prevented and at the same time a motor module is prevented from directly striking a dash panel in the event of frontal impact.

Furthermore, the left and right members are formed in a 'Π' shape in section together. In other words, each of the left and right members is formed in a hollow shape to facilitate absorbing of impact energy in the event of impact.

The left and right members 111a, 111b of the side member upper part 110 and the connection portion 113 may be formed at the same height but may be formed in different shapes depending on the shape of the vehicle body 10.

The side member lower part 120 is configured to allow a portion thereof to be coupled to a lower portion of the side member upper part 110 and allow the remaining portion thereof to be coupled to a lower portion of the vehicle body.

The side member lower part 20 may be formed in a 'Y' shape, but may be formed in a 'T' shape depending on layout of the vehicle body.

Each of the side member lower parts 120 includes a straight coupling portion 121 to be coupled to the left or right member, an inclined portion 122 extending at a predetermined angle and a predetermined slope from the straight coupling portion 121, a rear lower portion 123 branched from the inclined portion 122 to one side, and a mounting portion 125 branched from the inclined portion 122 to the other side.

The side member lower part 120 has a structure in which a lower end portion of an existing front side member, a rear lower member and a sub-frame mounting bracket are combined together, minimizing layout interference that may be caused by installation of a large capacity battery.

Figure 4B:
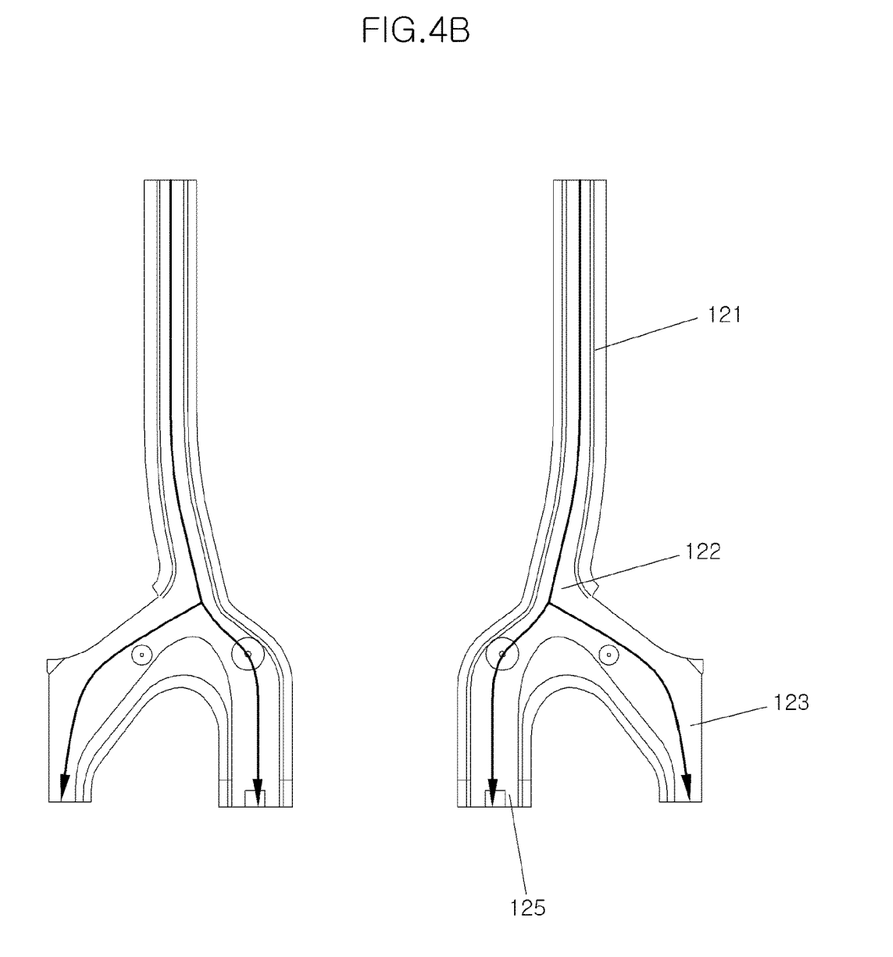
Figure 4C:
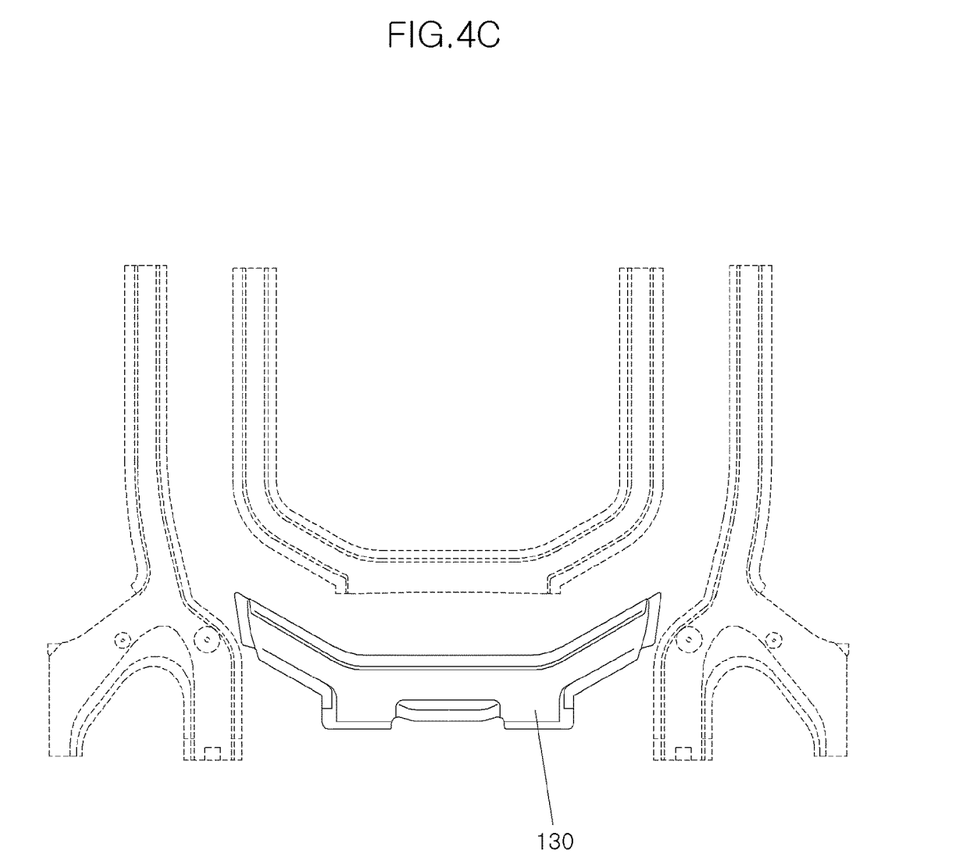

Furthermore, the side member lower parts 120 are configured to transfer impact energy to a chassis and a side chamber through their rear lower portions 123 and mounting portions 125, as shown in FIG. 4B.

Figure 5:
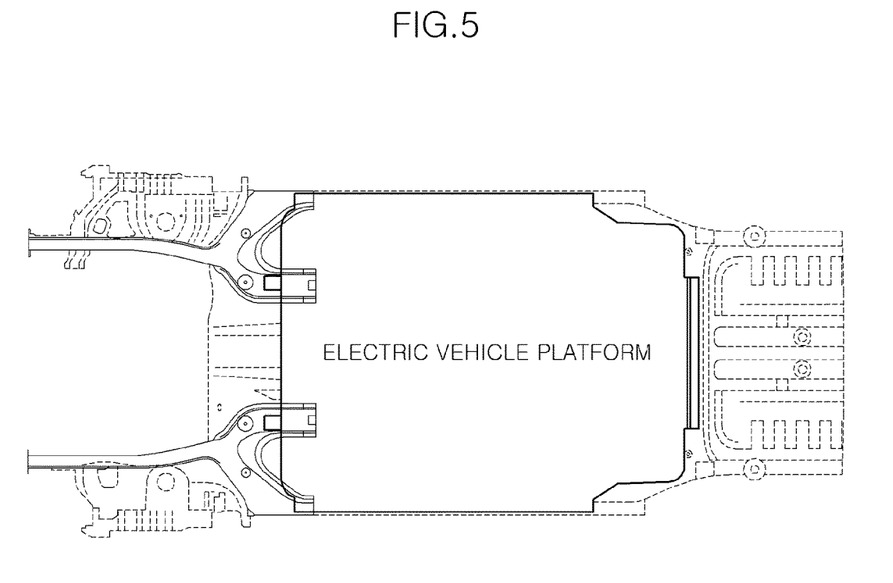
FIG. 5 is an exemplary view showing an electric vehicle platform to which an integrated side member having an impact absorbing structure according to an exemplary embodiment of the present invention is applied.

The rear lower portion 123 and the mounting portion 125 are formed to have their respective height lower than that of the straight coupling portion 121 and then coupled to the lower portion of the vehicle body while they are formed such that impact energy can be distributed to the rear lower portion 123 and the mounting portion 125 so that the length of the rear lower portion and the mounting portion can be shortened, with the result that a space for an electric vehicle platform can be easily secured as shown in FIG. 5.

Therefore, with the integrated side member having the impact absorbing structure according to an exemplary embodiment of the present invention, it is possible to easily secure space for mounting a large capacity battery for an environmental friendly vehicle and also easily secure merchantability of the environmental friendly vehicle while satisfying requirements involved in reducing space of the vehicle body and increasing weight of the vehicle, which are required under regulations related to impact.

Furthermore, the integrated side member having the impact absorbing structure according to an exemplary embodiment of the present invention is integrally formed so that a structure for welding can be improved and assemblability of the vehicle body can be enhanced.

The dash cross member 130 is coupled between the side member upper part 110 and the side member lower part 120 to reinforce rigidity of both the side member upper part and the side member lower part.

The dash cross member 130 is a portion to which the connection portion 113 of the side member upper part 110 is coupled wherein it is formed so to correspond to the shape of the connection portion 113 of the side member upper part 110.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated side member having an impact absorbing structure, comprising:

a side member upper part connected to a front coupling end portion to be connected to a crash box, the side member upper part being formed in a 'U' shape by connecting first and second members thereof to each other;

side member lower parts fastened to the side member upper part; and a dash cross member coupled to a lower portion of the side member upper part and between the side member lower parts, wherein the side member lower parts are formed in a 'Y' shape respectively.

2. The integrated side member according to claim 1, wherein the side member upper part includes a connection portion for connecting the first member and the second member.

3. The integrated side member according to claim 1, wherein each of the side member lower parts includes a straight coupling portion to be coupled to the first or second member, an inclined portion extending at a predetermined angle and a predetermined slope from the straight coupling portion, a rear lower portion branched from the inclined portion to a first side thereof, and a mounting portion branched from the inclined portion to a second side thereof.

4. The integrated side member according to claim 3, wherein the side member lower parts are configured to transfer impact energy to a chassis and a side chamber through rear lower portions and mounting portions thereof.

5. The integrated side member according to claim 3, wherein the rear lower portion and the mounting portion are formed to have a respective height thereof lower than a height of the straight coupling portion and then coupled to a lower portion of a vehicle body.

6. The integrated side member according to claim 1, wherein the dash cross member is configured to increase rigidity of the side member upper part and the side member lower part.

7. The integrated side member according to claim 1, wherein a connection portion of the side member upper part is configured to prevent rigid bodies in an engine compartment from striking a passenger cabin of a vehicle.

8. The integrated side member according to claim 7, wherein a first side of the connection portion is formed with a coupling portion to be coupled to a vehicle body.

9. The integrated side member according to claim 1, wherein the first and second members are formed in a 'Π' shape in section together.

* * * * *